(12) United States Patent
Mesropyan et al.

(10) Patent No.: US 8,502,850 B2
(45) Date of Patent: Aug. 6, 2013

(54) LASER MARKING OF AN INTERIOR CAVITY OF A SECURING MEANS OF A SUBSTANCE-CONTAINER

(75) Inventors: Ashot Mesropyan, Fremont, CA (US); Michael Lloyd Watts, UnionCity, CA (US)

(73) Assignee: Telesis Technologies, Inc., Fremont, CA (US)

( * ) Notice: Subject to any disclaimer, the term of this patent is extended or adjusted under 35 U.S.C. 154(b) by 286 days.

(21) Appl. No.: 12/939,201

(22) Filed: Nov. 4, 2010

(65) Prior Publication Data

US 2012/0111865 A1    May 10, 2012

(51) Int. Cl.
*B41J 2/435* (2006.01)
*B41J 2/44* (2006.01)
*B41J 2/47* (2006.01)

(52) U.S. Cl.
USPC ........... 347/224; 347/255; 215/230; 220/304; 430/292; 430/346; 430/363; 430/945; 219/121.68

(58) Field of Classification Search
USPC ................... 215/230, 316; 220/304; 347/224, 347/225, 255; 430/346, 363, 945; 219/121.68, 219/121.69
See application file for complete search history.

(56) References Cited

U.S. PATENT DOCUMENTS

| 6,105,806 A | * | 8/2000 | Stasiuk | 220/269 |
| 2007/0289935 A1 | * | 12/2007 | Granger et al. | 215/230 |
| 2010/0000960 A1 | * | 1/2010 | Anderson | 215/228 |

FOREIGN PATENT DOCUMENTS

JP    2009227301 A   * 10/2009

* cited by examiner

*Primary Examiner* — Samuel M Heinrich
(74) *Attorney, Agent, or Firm* — Raj Abhyanker, P.C.

(57) ABSTRACT

A method, an apparatus and/or a system of laser marking of an interior cavity of a securing means of a substance container is disclosed. In one embodiment, a solid-state laser marking system to mark a securing means of a substance container includes a semiconductor laser to emit a pumping laser beam. The solid-state laser marking system also includes a resonator to create the laser beam that is then focused through a lens to mark the securing means of the substance container having a maximum diameter of 5 cm. Further, the solid-state laser marking system includes a solid-state laser crystal doped with a rare-earth element, to produce a laser beam in response to being pumped by the pumping laser beam and a laser resonator. The laser resonator is configured to focus the laser beam of a spot size of less than 150 microns and a beam quality of $M^2$ less than 1.3.

19 Claims, 8 Drawing Sheets

US 8,502,850 B2

LASER MARKING OF AN INTERIOR CAVITY OF A SECURING MEANS OF A SUBSTANCE-CONTAINER

FIELD OF TECHNOLOGY

This disclosure relates generally to a solid-state laser and, more particularly, to a method, an apparatus and/or a system of laser marking of an interior cavity of a securing means of a substance container.

BACKGROUND

A company involved in a production of a substance-container (e.g., a bottle cap manufacturer, a manufacturer of plastic bottles, a bottling company, a beverage maker, etc.) may want to mark an interior cavity of a cap of the substance container with a unique identifier, a set of information pertaining to a liquid (e.g., expiry date, bottled date, manufactured date, etc.) and/or a marketing information associated with a promotion of the liquid-container bottle (e.g., a promotional code, a promotional details, a lucky winner code, etc.). Marking the interior cavity of the cap using an inkjet marker may involve high maintenance costs because of expensive ink, spills, and/or consumable costs (e.g., regular replacements, refills of ink). Furthermore, marking the interior cavity of the cap with the inkjet marker may not be permanent and/or may fade with time. In addition, an ink of the inkjet marker may contaminate other areas of the bottle when exposed to environmental conditions (e.g., heat, pressure, cold, liquids, other plastic, air, etc.). This may create health hazards when a liquid is consumed directly from the liquid container bottle (e.g., when the liquid is a beverage drink).

In another example, when an inkjet marking of the liquid-container bottle is tampered with, an innocent consumer may be tricked about vital details related to a liquid in the liquid-container bottle (e.g., an expiration date of the liquid may have passed). The innocent consumer may also be easily misled about the efficacy and/or contents of the liquid in the liquid-container bottle. This may cause the innocent consumer to get sick, and in some cases even die. Consequently, the company involved in the production of the liquid-container bottle may be liable under a negligence theory, a defective product liability theory, a civil statute, and/or a criminal statute. The company may incur financial losses as a result and may permanently suffer from diminished reputation propagated through ensuing negative publicity indirectly caused by a delible nature of the inkjet marking.

SUMMARY

Disclosed are a method, an apparatus and/or a system, of laser marking of an interior cavity of a securing means of a substance container.

In one aspect, a solid-state laser apparatus to mark a securing means of a substance container includes a semiconductor laser to emit a pumping laser beam. The solid-state laser apparatus also includes a lens to focus the laser beam to mark the securing means of the substance container having the diameter of no more than 5 cm. The solid-state laser apparatus also includes a solid-state laser crystal doped with a rear-earth element, to produce a laser beam in response to being pumped by the pumping laser beam. In addition, the solid-state laser apparatus includes a laser resonator. The laser resonator may be configured to create the laser beam having a spot size of less than 150 microns and a beam quality of $M^2$ less than 1.3.

Further, the solid-state laser apparatus includes a Q-switch mounted in the laser resonator to concentrate a power generated in the laser resonator into a set of short pulse bursts. Also, the solid-state laser apparatus includes a master oscillator to generate the laser beam at a requisite laser frequency, a requisite beam quality and a requisite pulse width. The solid-state laser apparatus may also include a power amplifier to amplify the laser beam. The solid-state laser apparatus also includes a master-oscillator-amplification (MOPA) system to achieve a set of laser parameters. The set of laser parameters may include one or more of the requisite pulse width, the requisite beam quality and the requisite laser frequency.

In addition, the solid-state laser apparatus includes a thermo-electric air cooler to counteract an accretion of heat generated from a set of heat-generating components in the laser resonator and a custom designed controller 130 to control and manage a set of functions associated with the laser. Furthermore, the solid-state laser apparatus includes an adjustable mirror holder in the laser resonator to allow an optimal placement of a set of mirrors depending on a set of specifications associated with the set of mirrors.

In another aspect, a method of marking a securing means of a substance container having a diameter of no more than 5 cm includes molding a pliable material into a securing means. The pliable material has a geometrically shaped upper surface having a diameter of no more than 5 cm, a lower surface and a perpendicular surrounding structure encompassing a periphery of the lower surface. The method also includes embedding a fastening component into an interior portion of the perpendicular surrounding structure to affix a container to the securing means.

The method also includes applying a solid state laser to the lower surface of the securing means and achieving a laser spot size that is less than 150 microns on the lower surface of the securing means.

In addition, the method also includes positioning a thermo-electric air cooler directly adjacent to a set of heat-generating components of a laser resonator. The thermo-electric air cooler configured to counteract an accretion of heat generated from the heat-generating components.

The method also includes achieving a beam quality of $M^2$ less than 1.3 and a pulse width of between 10 nanoseconds and 100 nanoseconds with the laser resonator. The method also includes generating a short pulse through a master oscillator. The method also includes boosting energy of the short pulse through a power amplifier. The method further includes achieving set of laser parameters through a master oscillator power amplification (MOPA) system. The set of laser parameters may be at least one of a requisite pulse width, a requisite beam quality and a requisite laser frequency;

In addition, the method also includes boosting an output power of the laser through a master oscillator power amplifier (MOPA) system and generating a short pulse through the MOPA system.

In addition, the method includes customizing a controller using a specially-designed computer progressing unit to increase an efficiency of the laser resonator during the laser marking process. The method further includes compensating for a fault tolerance of a mirror with an adjustable mirror holder to allow an optimal placement of the mirror. The fault tolerance may depend on a set of specifications associated with the mirror.

In yet another aspect, a securing means of a substance container marked with a laser includes a planar pliable material formed in a geometric shape having an upper surface and a lower surface. The lower surface is marked with a laser beam having a spot size of less than 150 microns. In addition, the securing means of the substance container also includes a perpendicular surrounding structure encompassing a periphery of the planar pliable material. The structure is geometric in shape such that the lower surface is placed in a cavity area surrounded by the perpendicular sounding structure at a substantially perpendicular plane and in which an opposite plane to the lower surface remains open. The securing means of a substance container also includes a fastening component to affix the securing means to the substance container. The fastening component is embedded into an interior portion of the perpendicular surrounding structure such that the fastening component is placed entirely in the cavity area surrounded by the perpendicular surrounding structure.

The methods and the systems disclosed herein may be implemented in any means for achieving various aspects. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system of laser marking of an interior cavity of a securing means of a substance container. Although the present embodiments have been described with reference to specific example embodiments, it will be evident that various modifications and changes may be made to these embodiments without departing from the broader spirit and scope of the various embodiments.

Figure 1:
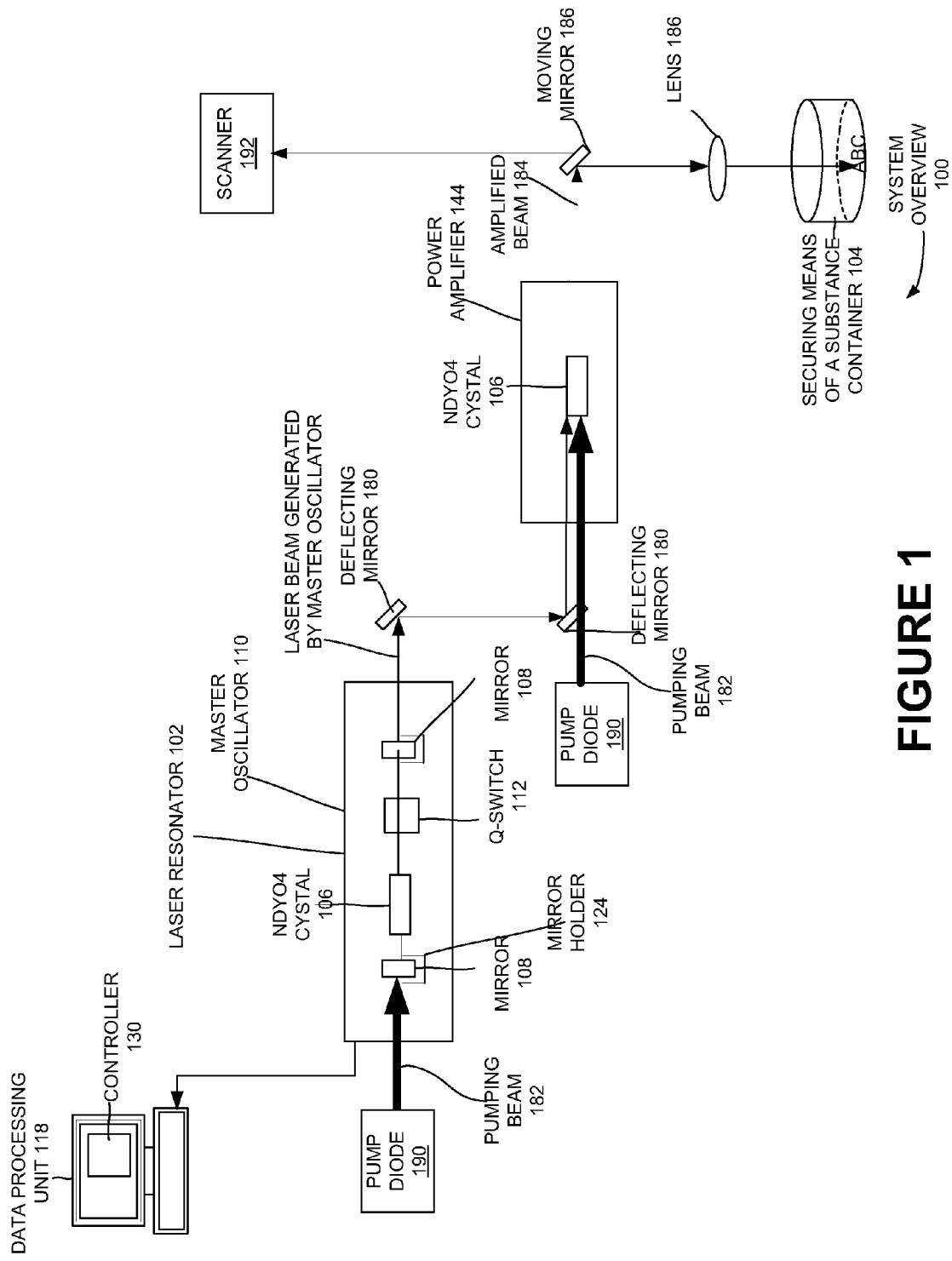
FIG. 1 is a schematic view of a solid-state laser marking system, according to one or more embodiments.

FIG. 1 is a system overview of a solid-state laser marking system 100, according to one or more embodiments. In one or more embodiments, the solid-state laser marking system 100 may include a laser resonator 102. In one or more embodiments, the solid state laser marking system 100 may be optimized to focus the laser beam to generate a laser spot size having a diameter of less than 150 microns. In one or more embodiments, the solid-state laser marking system may include a pump diode 190 that generates a pumping beam 182. In one of more embodiments, the pumping beam may go through the laser resonator. In one of more embodiments, the solid-state laser marking system 100 may include a master oscillator to generate a laser beam that has a requisite laser frequency, a requisite beam quality and a requisite pulse width. The laser resonator may have a set of mirrors 108. In one or more embodiments, the solid-state laser marking system 100 may also include a solid-state laser crystal $Nd:YVO_4$ (Neodymium-Doped Yttrium Orthovanadate) 106 doped with a rare-earth element Neodymium. In one or more embodiments, the laser resonator 102 may include a Q-switch mounted in the laser resonator to concentrate a power generated in the laser resonator into a set of short pulse bursts. In one or more embodiments, power generated in the laser resonator 102 may be concentrated into a set of short pulse bursts through a Q-switch 112. In one or more embodiments, a Q-switch 112 may be mounted in the laser resonator 102. In one embodiment, the Q-switch 112 may be an acousto-optic Q-switch. In one or more embodiments, the Q-switch 112 may be used with the laser resonator 102 for the purpose of active Q switching the laser. The Q switching may be a technique for generating short intense pulses, where the pulse duration is typically in the nanosecond range (ns). For example, a 25 Watt laser may generate pulses of a certain range, the Q-switch 112 may compress the energy into short pulses of about 20 ns or 1 ns and to generate a peak power of 70,000 Watt.

In one or more embodiments, the laser resonator 102 as described herein may be designed using a set of mechanics based on a mathematical model optimized for thermo-electric cooling. In one or more embodiments, the length and other parameters of the laser resonator 102 may be optimized to achieve a pulse width between 10 nanoseconds (ns) and 100 ns. In one or more embodiments, the lasing medium may be a material with properties that allows the lasing medium to amplify light by stimulated emission.

Also, according to one or more embodiments, the set of mirrors 108 may be arranged such that the light wave bounces back and forth, each time passing through the lasing medium. In one or more embodiments, the curvature of each of the mirrors 108 is precisely designed based on a mathematical model. In one or more embodiments, an adjustable mirror holder 124 may be used in the laser resonator 102 to support, adjust and control the positions and optimally place the set of mirrors 108 based on a set of specifications associated with the set of mirrors 108. The set of specifications associated with the set of mirrors 108 may be a size of the mirror, and/or a focal length of the mirror. Also, the adjustable mirror holder 124 may be controlled through a controlling means (e.g., motor). The control means may be controlled through a data processing unit 118. In one or more embodiments, a fault tolerance associated with the set of mirrors 108 may be compensated through the adjustable mirror holder(s) 124 controlled through the data processing unit 118. The fault tolerance associated with the set of mirrors 108 may also be compensated through the adjustable mirror holder(s) 124 depending on the set of the specifications associated with the set of mirrors. In one or more embodiments, the fault tolerance may include, but may not be limited to, a focal length, damage threshold, a reflection and a curvature. In or more embodiments, the $Nd:YVO_4$ (Neodymium-Doped Yttrium Orthovanadate) crystal 106 may be calculatively positioned between the set of mirrors 108 to generate a laser beam. In one or more embodiments, the set of mirrors may be positioned at optimized distances based on the mathematical model. In one or more embodiments, the laser resonator 102 may be sealed to avoid a set of disturbances associated with outside environmental conditions.

Figure 2:
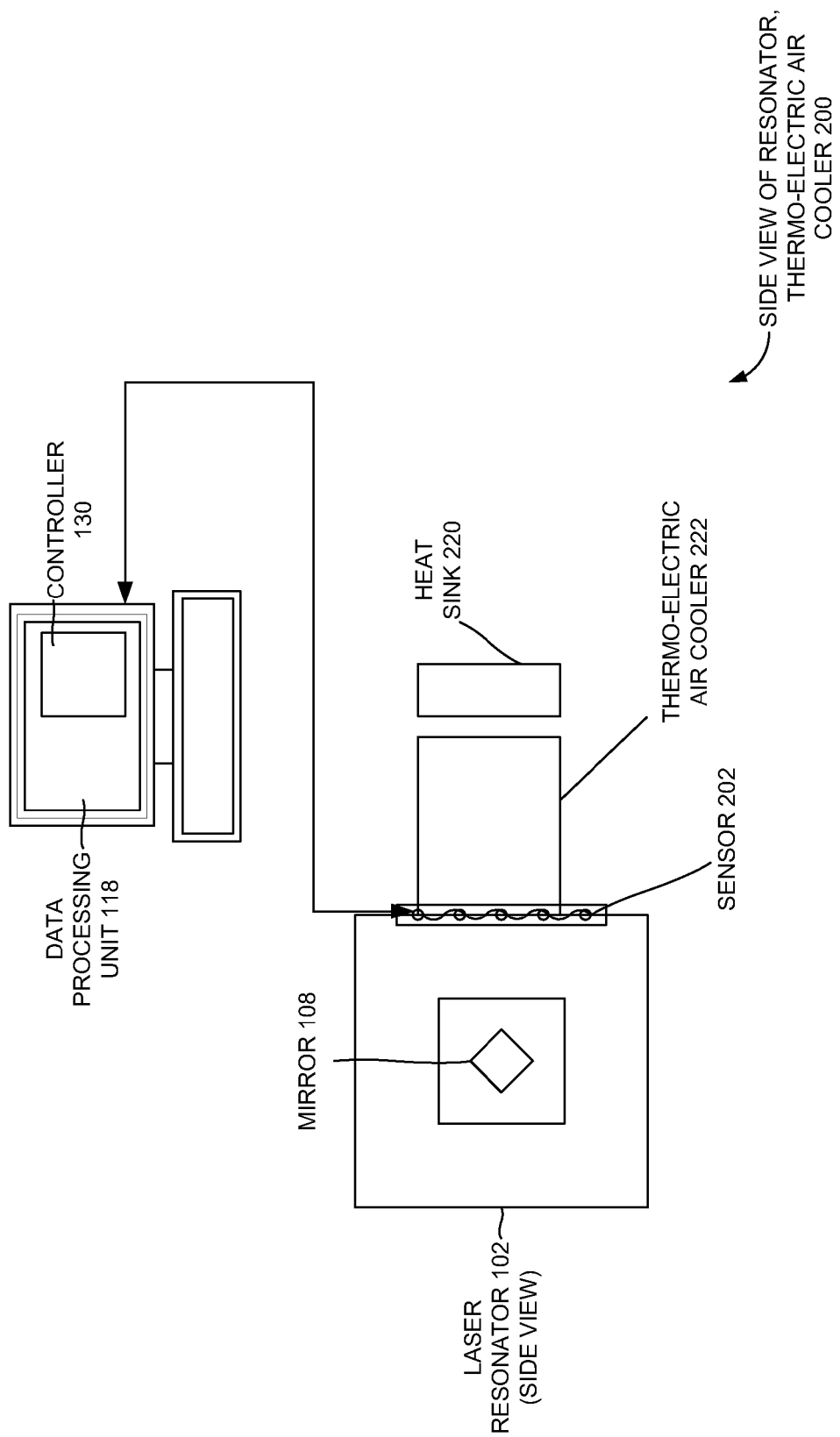
FIG. 2 is a schematic view illustrating a side view of a resonator and a thermo-electric air cooler, according to one or more embodiments.

In one or more embodiments, a thermo-electric air cooler 222 may be placed directly adjacent to the laser resonator 102 to absorb the heat generated by one or more heat generating components in the laser resonator 102. In one or more embodiments, the heat generating components may include the Nd:YV0$_4$ (Neodymium-Doped Yttrium Orthovanadate) cystal106 106 and a Q-switch 112. A heat sink 220 may be coupled to a side of a thermo-electric air cooler 122 to dissipate the heat absorbed by the thermo-electric air cooler 222, according to one or more embodiments. The heat sink 220 may be coupled with a fan to dissipate the heat to the outside environment. In one or more embodiments, the laser resonator 102 may be designed to place the heat generating components at a particular location to enable a placement of the thermo-electric air cooler 222 to absorb heat generated. The arrangement of the laser resonator 102, the heat sink 220 and the thermo-electric air cooler 222, according to one example embodiment is illustrated in FIG. 2.

Figure 3:
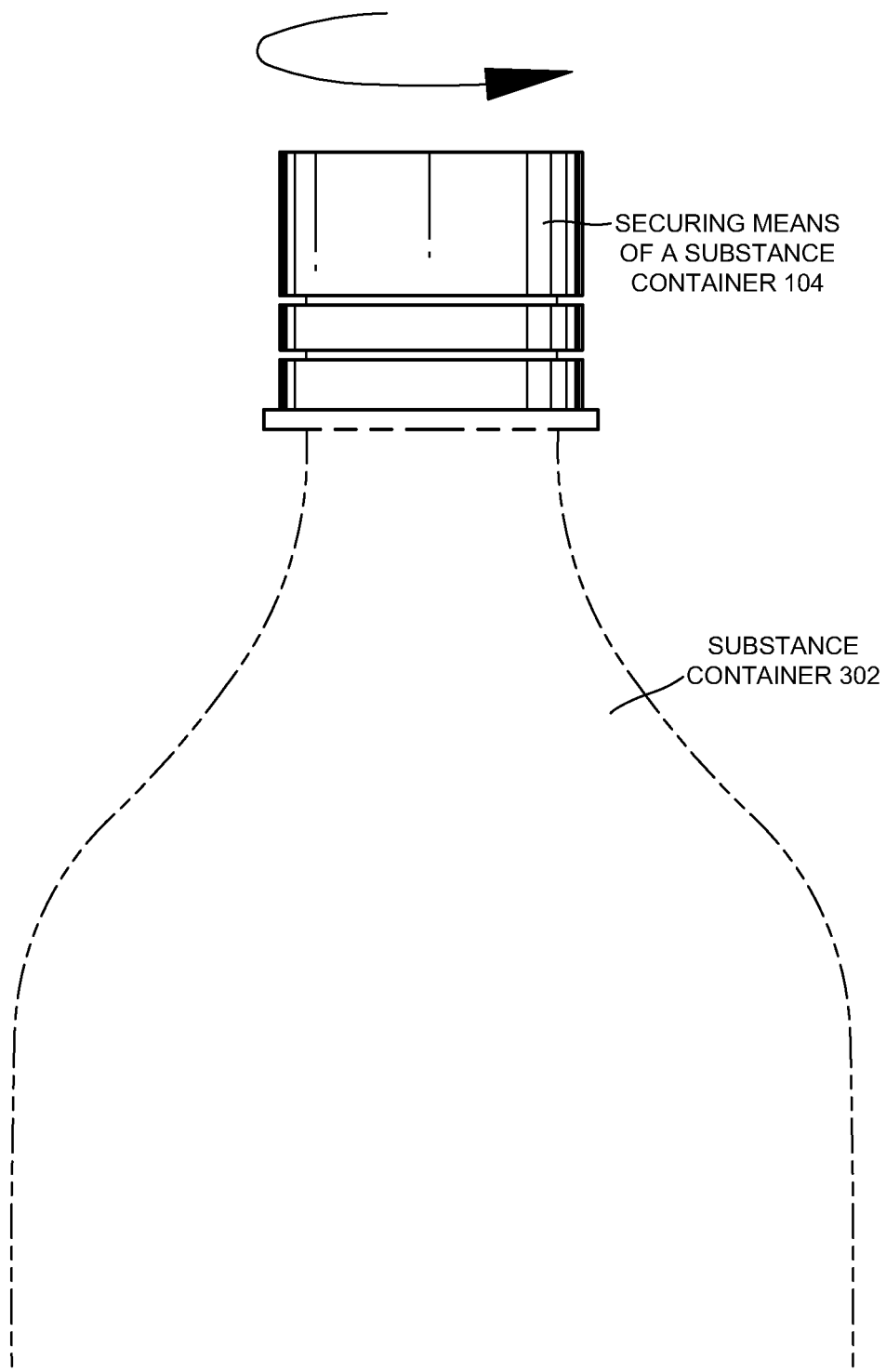
FIG. 3 is a schematic view of a securing means of a substance container, according to one or more embodiments.

In one or more embodiments, the solid-state laser marking system 100 may also include a solid-state laser crystal Nd:YV0$_4$ (Neodymium-Doped Yttrium Orthovanadate) 116 doped with a rare-earth element Neodymium. In one or more embodiments, the solid-state laser crystal Nd:YV0$_4$ 116 may be used to generate a stable high power laser beam. In one or more embodiments, the laser beam generated by the master oscillator 110 may then be deflected by a set of deflecting mirrors 180. The laser beam generated by the master oscillator 110 may then pass through a power amplifier 144 that may amplify the laser beam. The power amplifier may also receive a pumping beam from another pump diode 190. In one or more embodiments, the power amplifier 144 may hold the Nd:YV0$_4$ (Neodymium-Doped Yttrium Orthovanadate) crystal 106. In one or more embodiments, the power amplifier may then generate an amplified beam 184. In one or more embodiments, a moving mirror 186 may be connected to a scanner 192. In one or more embodiments, the scanner 192 may direct the beam to the object that needs to be marked. In one or more embodiments, the scanner 192 may direct the beam to mark a certain shape. In one or more embodiments, the scanner 192 may be coupled to a data processing unit. In one or more embodiments, the amplified beam may then be deflected by the moving mirror and pass through a lens 186 that focuses the beam onto the object being marked. The lens 186 may focus the amplified beam 184 to mark the securing means of a substance container 104. In one or more embodiments, the amplified beam 184 may pass through the lens 186 to mark the securing means of a substance container 104. In one or more embodiments, the laser beam generated herein may be used for marking a securing means (e.g., bottle cap as illustrated in FIG. 3) of a substance container. In one or more embodiments, the securing means as described herein may have a diameter of no more than 5 cm. In one or more embodiments, the laser beam generated through the laser resonator 102 may be focused to have a spot size of less than 150 microns and a beam quality of $M^2$ less than 1.3.

In another embodiment, the spot size of the laser beam in the focus may be directly proportional to the beam quality factor or beam propagation factor ($M^2$). In one or more embodiments, $M^2$ may be a measure of the beam quality of the laser beam. When the $M^2$ value is larger, the beam quality maybe lower. In some embodiments, the best $M^2$ theoretical value may be 1. In one or more embodiments, the laser beam may have to be focused to achieve a spot size of less than 150 microns. In one or more embodiments, the $M^2$ value of the laser beam may be maintained less than 1.3. In one or more embodiments, the length of the laser resonator is selected such that the pulse width ranges from 10 ns to 100 ns, Also, the wavelength achieved by the laser resonator 102 may range between 250 microns to 1500 microns according to one or more embodiments.

In one or more embodiments, a master oscillator power amplifier (MOPA) may be included in the solid-state laser marking system 100. In one or more embodiments, MOPA refers to a configuration consisting of a master oscillator 110 and a power amplifier 144 to boost an output power and/or to achieve one or more laser parameters such as a requisite pulse width, a requisite beam quality and/or a requisite laser frequency. In one or more embodiments, the MOPA system may include a master oscillator to generate the laser beam at a requisite laser frequency, a requisite beam quality and/or a requisite pulse width. In one or more embodiments, the power amplifier may increase a laser pulse energy without significantly affecting the requisite frequency, a requisite beam quality and/or a requisite pulse width.

In one or more embodiments, the data processing unit 118 may be coupled to the solid-state laser marking system 100. In another embodiment, the data processing unit 118 may include the controller 130 configured to control and/or to manage a set of functions associated with the solid-state laser marking system including controlling the laser resonator 102, controlling angles of adjustable mirror holder(s) 124, optimizing the adjustable mirror holder(s) 124, obtaining input from sensors, controlling a temperature of the laser resonator 102 through controlling the thermo-electric air cooler 122, compensating fault tolerances associated with the set of mirror 108, and controlling the movement of the deflecting mirror 180.

In one or more embodiments, the controller 130 may be a custom designed controller enabled with drivers configured control and/or to manage a set of functions associated with the solid-state laser marking system 100. Also, in one or more embodiments, the controller 130 may be customized using a specially-designed computer processing unit to increase an efficiency of the laser resonator 102 during the laser marking process. In one or more embodiments, the data processing unit 118 may be a customized data processing unit optimized for the solid-state laser marking system 100. In one or more embodiments, the data processing unit 118 may include one or more input devices (e.g., keyboard, Compact Disk (CD)/Digital Versatile Disc (DVD) reader, a memory card reader), one or more interfaces to communicatively couple the data processing unit 118 to the solid-state laser marking system 100, the controller 130, and a memory unit. A set of electronics associated with the custom designed controller may be optimized to increase the efficiency of the laser resonator 102. Additionally, a securing means of a substance container 104 may be included in the solid-state laser marking system 100 on which the marking operation is performed.

According to one or more embodiments, the solid-state laser may be a diode pumped solid-state laser (DPSS laser). In one or more embodiments, the DPSS laser beam may be generated through a pump laser diode or diode array with a laser crystal. Further, in one or more embodiments, the laser beam generated may be passed through the power amplifier 144 to boost the output power. The laser beam may be generated from the laser resonator and may then be passed through the power amplifier 144 to generate an amplified beam that may then be focused to have a spot size of less than 150 microns and a beam quality of $M^2$ less than 1.3.

The laser resonator 102 may include energy sources such as a pump source, the lasing medium and two or more mirrors. The pump source (e.g., electric discharges, flash lamps, semiconductor laser) may provide energy to the solid-state laser system. The energy supplied by the pump source may be an initial energy provided to excite the atoms within the gain medium to achieve stimulated emission and population inversion needed for light amplification (the laser beam). The lasing medium (e.g., solids, semiconductors) may be an active laser medium or the source of atoms used to achieve stimulated emission and population inversion. The lasing medium may be selected based on laser operational wavelength and/or various other properties. (e.g., laser beam quality, laser operational frequency etc.).

In one or more embodiments, the set of mirrors 108 of the laser resonator 102 may be coated with optical coatings that determine their reflective properties. One mirror may be fully coated termed as a high reflector where nearly all photons reaching the high reflector mirror may reflect. Another mirror, termed as a partial reflector or output coupler, may be partially coated to allow some of the photons or light to leave the laser resonator. In one or more embodiments, the adjustable mirror holder 124 may be included in the laser resonator 102 to allow an optimal placement of the set of mirrors 108 depending on a set of specifications associated with the set of mirrors 108. The laser marking process is described in FIG. 6A-C.

FIG. 2 illustrates a thermo-electric air cooling system 200, according to one or more embodiments. The thermo-electric air cooler 222 may be coupled to the laser resonator 102. In one or more embodiments, the laser resonator 102 may be designed such that the thermo-electric air cooler 222 is in close proximity with the heat generating components of the laser resonator 102. In one or more embodiments, the heat generating component may be positioned in the special pockets and special corners designed thereof inside the laser resonator 102 to cool the heat generating components through the thermo-electric air cooler 122. In some example embodiments, the thermo-electric air cooling system 200 may be a size of 1 inch, 1½ inch, 2 inch, 2½ inch devices. In one or more embodiments, the laser resonator 102 may be coupled with a sensor 202 that may in turn be connected to a controller 130 and a data processing unit 118. In one or more embodiments, the controller may monitor or adjust a temperature of the resonator. In one or more embodiments, the thermo-electric air cooler 122 may be positioned directly adjacent to the set of heat-generating components of the laser resonator 102. In one or more embodiments, the thermo-electric air cooler 222 may have a hot side and cold side. In one or more embodiments, the cold side of the thermo-electric air cooler 222 may be placed directly adjacent to the laser resonator 102 such that the side of the laser resonator 102 that contains the heat generating components is directly next to the cold side of the thermo-electric air cooler. In one or more embodiments, a heat sink 220 may be placed next to the hot side of the thermo-electric air cooler 222 to dissipate the heat generated to the outside environment. In one or more embodiments, the heat sink 220 may be coupled with a fan or other dispersing device to dissipate the heat generated. In one or more embodiments, the thermo-electric air cooler 222 may be a device used for cooling a surface. In one or more embodiments, thermo-electric air cooler 222 may have a cooling side which can be coupled to a surface that requires cooling.

In one or more embodiments, an electric current may be applied to the thermo-electric air cooler 222 to generate a cold surface and/or a hot surface on opposite ends. In one or more embodiments, the cold surface of the thermo-electric air cooler 222 may be coupled through an appropriate means against a side of the laser resonator 102 that holds the set of heat generating components for cooling the heat generating components. Further, in one or more embodiments, the data processing unit 118 may be communicatively with the sensor 202 to monitor and stabilize a temperature of the laser resonator 102. In one or more embodiments, a temperature for optimal working of the laser resonator 102 may be input as a reference temperature into the data processing unit 118.

As illustrated from FIG. 2, in one or more embodiments, one or more temperature sensor(s) 202 may be placed adjacent to the laser resonator 102 to sense the temperature of the laser resonator 102. During operation of the laser resonator 102, the temperature value sensed through the temperature sensor(s) 202 may be stored in the memory of the data processing unit 118. In one or more embodiments, memory may include a non-volatile memory (e.g., Read-Only Memory (ROM), hard-disk) and/or a volatile memory (e.g., Random-Access Memory (RAM)).

In one or more embodiments, a sensed temperature may be subjected to a comparison with the reference temperature using the controller 130 of the data processing unit. In one or more embodiments, a flow of current to the thermo-electric air cooler 222 may be altered by the data processing unit 118 to maintain the temperature approximately equal to the reference temperature based on the information gathered from the set of temperature sensors 202.

Figure 4:
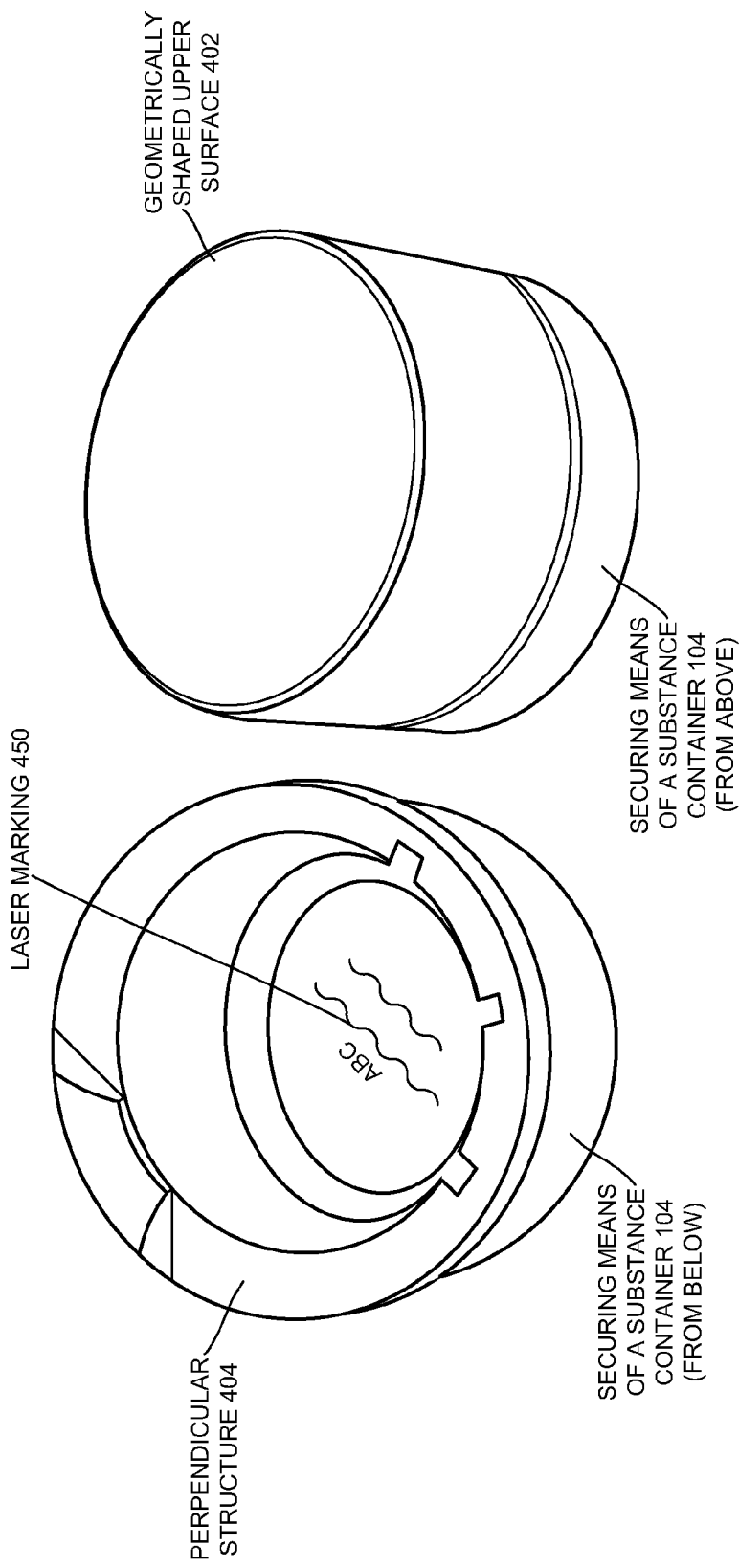
FIG. 4 is a schematic three dimensional view of the securing means of the substance container, according to one or more embodiments.

FIG. 3 shows a view of the securing means of the substance container 104, according to one or more embodiments. As described herein, the securing means may have a diameter of no more than 5 cm. FIG. 4 shows a 3D view of the securing means of the substance container. FIG. 4 illustrates a bottom view and an upper view of the securing means of substance container 104. The substance container may be a bottle having a securing means (e.g., a plastic cap, a metal cap). Each of the securing means may require different laser resonator settings for marking. Each time a different material is used, laser resonator settings such as the laser frequency, power, speed, focusing and other parameters may be changed and optimized depending upon the material used. In one or more embodiments, a matrix of different settings may be generated based on the type of the material of the securing means of the substance container 104 to determine a group of optimum settings for the securing material.

In one or more embodiments, the diameter of the securing means of the substance container 104 is not more than 5 cm. In one or more embodiments, the securing means of the substance container may include a planar surface formed using a pliable material (e.g., Thermoplastics, polymer materials, plastics, metal, etc.) in a geometric shape having both an upper surface and a lower surface. The lower surface is the surface that may be marked 450 with the laser beam having a spot size of less than 150 microns.

Also, in one or more embodiments, a perpendicular surrounding structure 404 may encompass a periphery of the planar pliable material such that the lower surface may be placed in a cavity area surrounded by the perpendicular surrounding structure 404. The opposite plane surrounded by the perpendicular surrounding structure 404 to the lower surface of the container may remain open.

In one or more embodiments, a fastening component such as a nylon fastener, plastic fastener may be affixed to the container through an appropriate means. The fastening component may be embedded into the interior portion of the perpendicular surrounding structure 404 such that the fastening component may be placed entirely inside the cavity area surrounded by the perpendicular surrounding structure 404. In one or more embodiments, a fiber-coupled DPSS laser may be used for marking the lower surface of the securing means. As described, the lower surface of the securing means may be marked with a focused laser beam having a beam quality of $M^2$ less than 1.3 and with a spot size of less than 150 microns. In one or more embodiments, the lower surface may be marked with the laser having a capability of counteracting, through the thermo-electric air cooler 222, an accretion of heat generated by a set of heat generating components in the laser resonator 102. In one or more embodiments, the lower surface may be marked with the laser having a capability of increasing an efficiency associated with the laser resonator 102 through a customized controller 130.

Figure 5:
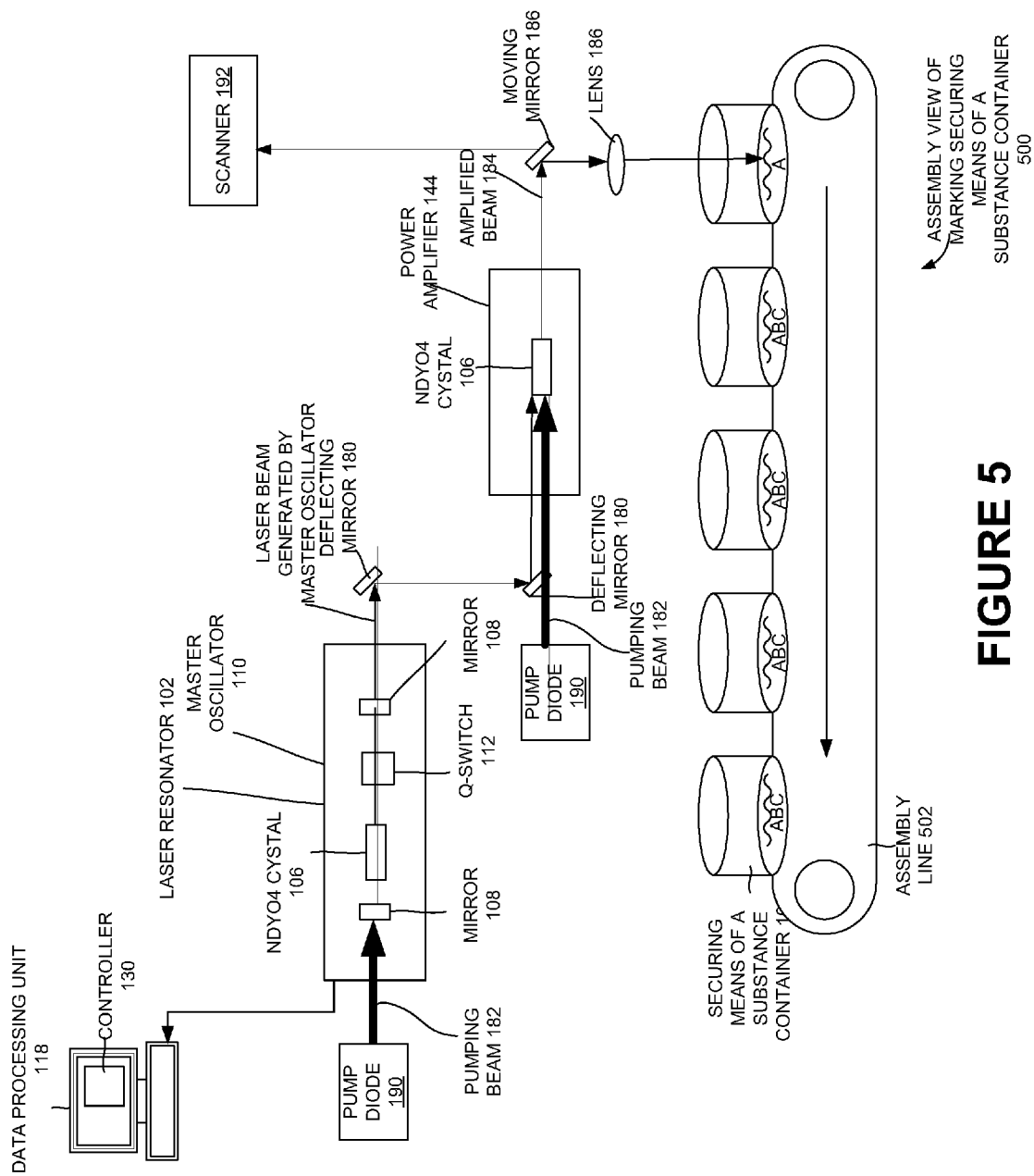
FIG. 5 is a schematic view of an assembly line of the system, according to one or more embodiments.

FIG. 5 is a schematic view of an assembly line 500 for marking the securing means of a substance container, according to one or more embodiments. In one or more embodiments, while marking, the laser may be stationary and the assembly line may move in x-y axis. In another embodiment, the assembly line 502 may be stationary, and the laser resonator or the deflecting mirror 180 (e.g. galvo mirrors) may move through appropriate means to trace out numbers and letters onto the surface being marked. The securing means of substance container (here, bottle caps) 104 may be horizontally placed along the assembly line 502. The laser marking system marks the marking on the lower surface of the securing means of the substance container 104. The markings to be marked in the interior cavity of the substance container may include a set of information pertaining to a liquid (e.g., expiry date, bottled date, manufactured date, etc.) and/or a marketing information associated with a promotion of the liquid-container bottle (e.g., a promotional code, promotional details, a lucky winner code, etc.). Different patterns may be marked by programming the controller 130 to traverse a particular path for the laser beam over time.

In one or more embodiments, the laser resonator 102 may be controlled with the custom designed controller 130. Also, in one or more embodiments, the set of electronics in the custom designed controller 130 may be optimized to increase the efficiency associated with the laser resonator 102.

Figure 6A:
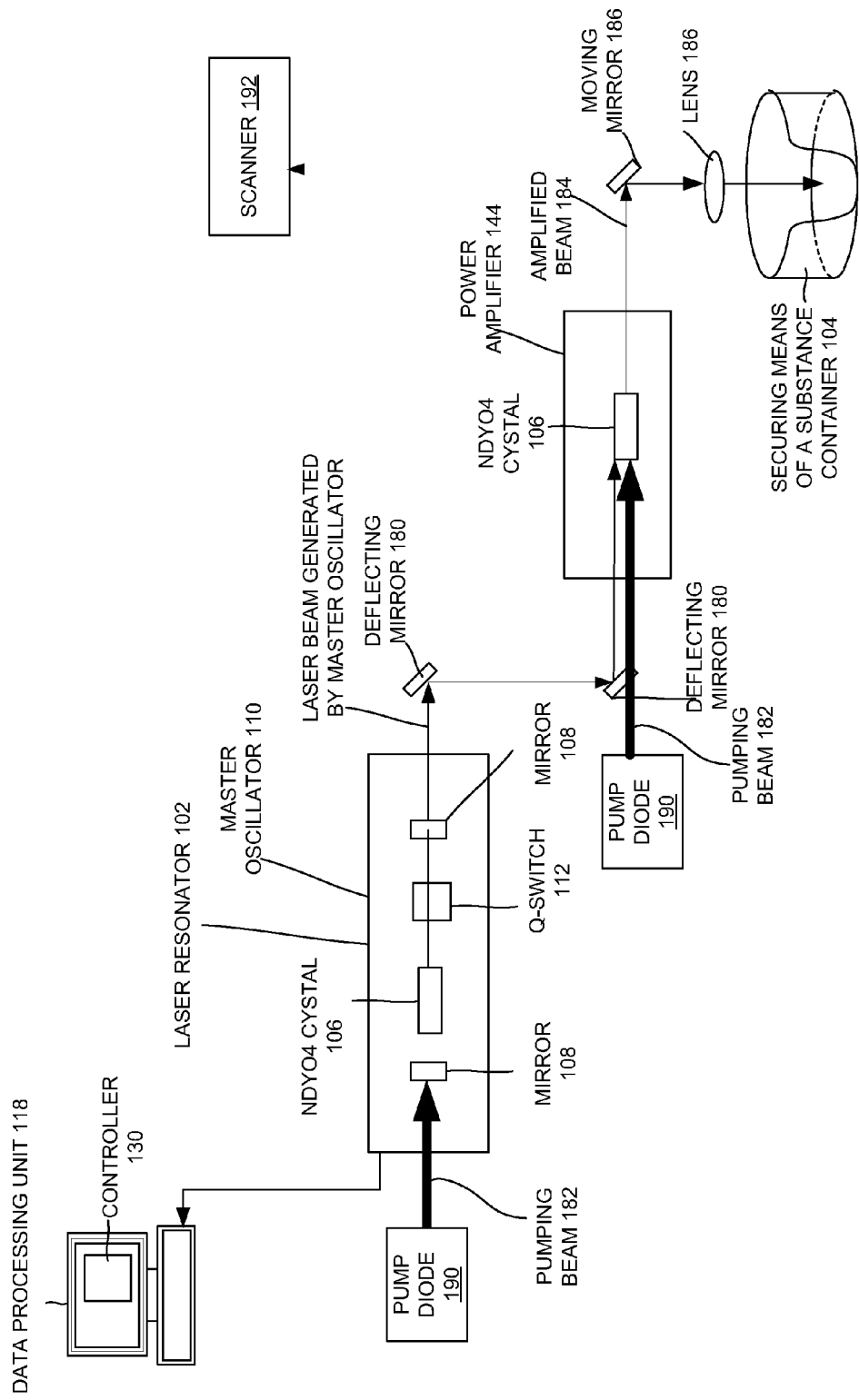
FIG. 6A-C is a graphical process flow illustrating marking of interior cavity of the securing means of the substance container, according to one or more embodiments.
Figure 6B:
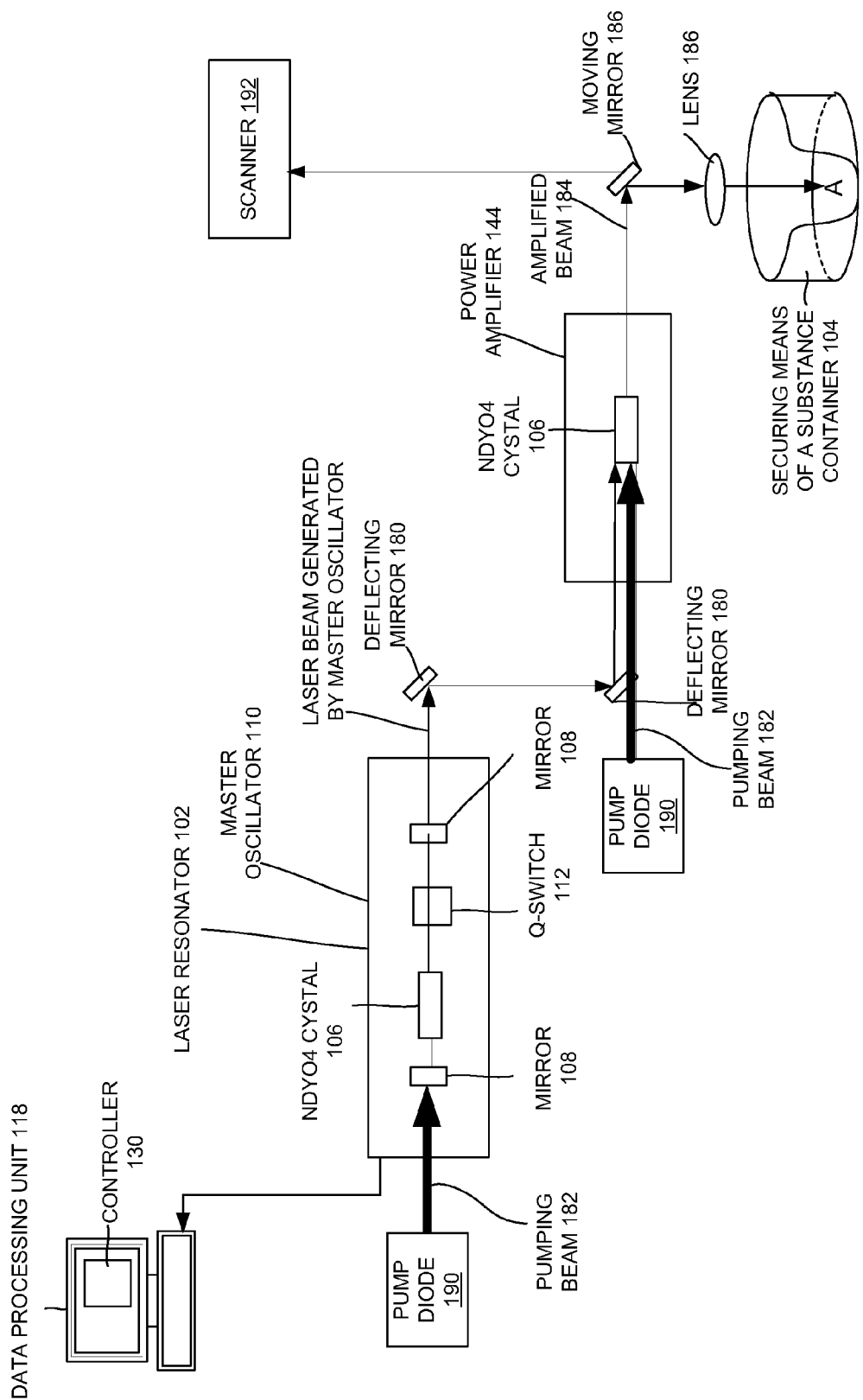
Figure 6C:
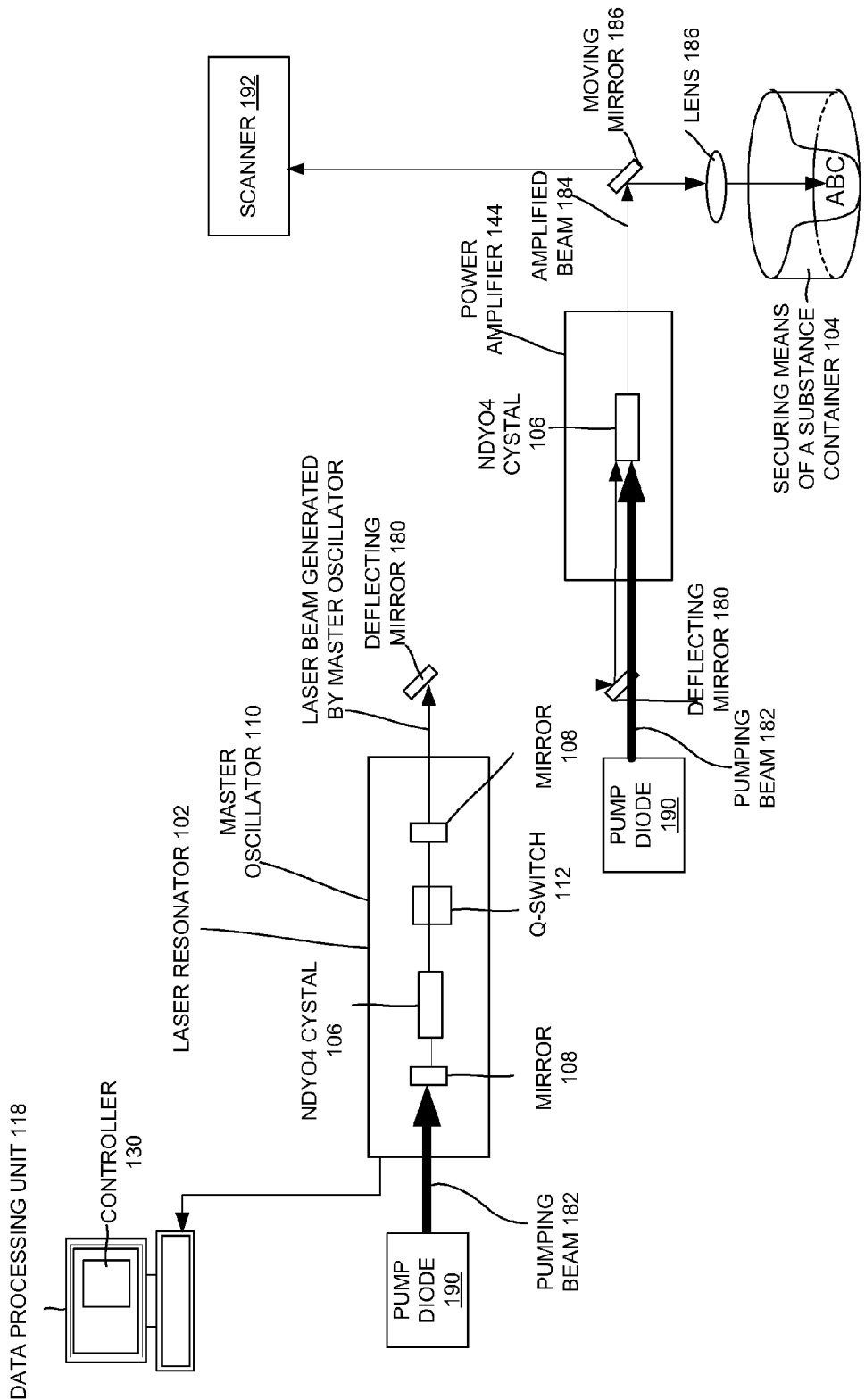

FIG. 6 illustrates an example scenario of the marking process, according to one or more embodiments. The securing means of a substance container 104 about to be marked is illustrated in FIG. 6A. Further, the securing means of a substance container 104 is in the process of being marked is illustrated in FIG. 6B and the securing means of a substance container 104 completely marked as ABC is illustrated in FIG. 6C. In or more embodiments, the set of characteristics associated with the laser may be optimized depending on the material of the securing means of the substance container. In one or more embodiments, the set of characteristics associated with the laser resonator may include, but is not limited to a laser frequency and a power of the laser. Further, in one or more embodiments, a matrix of different values may be generated based on the type of material of the securing means of the substance container 104 to determine a group of optimum settings for the material. In one example embodiment, the matrix of different values may be generated based on experimentation, and trial and error.

As discussed above, the width of the characters to be marked may be the spot size of the laser beam. In one or more embodiments, the spot size of the laser beam may be altered depending on the size and width of the characters to be marked on the securing means of the substance container 102. Also the laser spot size may be dependent upon one or more parameters such as lens selection, focus and the material being marked. The contrast of the laser mark may depend on the color of the material. The speed may be maintained to be constant during the process of marking on different color material. For example, the contrast on a black material may mark the best; the contrast on the yellow material may be good and the contrast on red material may be hard to mark at the same speed. In one embodiment, a red color may take longer time exposure due to low material quality. The number of containers to be marked per second may depend on the number of characters to be marked.

Although the present embodiments have been described with reference to specific example embodiments, it will be evident that various modifications and changes may be made to these embodiments without departing from the broader spirit and scope of the various embodiments.

What is claimed is:

1. A solid-state laser to mark a securing means of a substance container comprising:
a semiconductor laser to emit a pumping laser beam;
a lens to focus the laser beam to mark the securing means of the substance container having a diameter of no more than 5 cm;
a solid-state laser crystal doped with a rare-earth element, to produce a laser beam in response to being pumped by the pumping laser beam;
a laser resonator to create the laser beam;
    wherein the laser beam has a spot size of less than 150 microns and a beam quality of $M^2$ less than 1.3;
a Q-switch mounted in the laser resonator to concentrate a power generated in the laser resonator into a set of short pulse bursts;
a master oscillator to produce the laser beam at a requisite laser frequency, a requisite beam quality and a requisite pulse width;
a power amplifier to amplify the laser beam;
an oscillator-amplification system to achieve a set of laser parameters,
    wherein the set of laser parameters is at least one of the requisite pulse width, the requisite beam quality and the requisite laser frequency;
a thermo-electric air cooler to counteract an accretion of heat generated from a set of heat-generating components in the laser resonator;
a custom designed controller to control and manage a set of functions associated with the laser; and
an adjustable mirror holder in the laser resonator to allow an optimal placement of a set of minors based on a set of specifications associated with the set of mirrors.

2. The laser of claim 1 wherein the laser crystal is Nd:YVO$_4$ (Neodymium-Doped Yttrium Orthovanadate).

3. The laser of claim 1 further comprising:
a data processing unit associated with the thermo-electric air cooler to monitor and stabilize a temperature of the laser resonator.

4. The laser of claim 1 wherein a wavelength achieved is within a range of 250 to 1500 microns.

5. The laser of claim 1 wherein the Q-switch is an acousto-optic Q-switch.

6. The laser of claim 1 further comprising:
optimizing a length of the laser resonator to achieve a pulse width of between 10 nanoseconds and 100 nanoseconds.

7. A method of marking a securing means of a substance container having a diameter of no more than 5 cm comprising:
molding a pliable material into the securing means having a geometrically shaped upper surface having a diameter of no more than 5 cm, a lower surface and a perpendicular surrounding structure encompassing a periphery of the lower surface;
embedding a fastening component into an interior portion of the perpendicular surrounding structure to affix a container to the securing means;
applying a fiber-coupled diode pumped solid state laser to the lower surface of the securing means;
achieving a laser spot size that is less than 150 microns on the lower surface of the securing means;

positioning a thermo-electric air cooler directly adjacent to a set of heat-generating components of a laser resonator to counteract an accretion of heat generated from heat-generating components;

achieving a beam quality of $M^2$ less than 1.3 and a pulse width of between 10 nanoseconds and 100 nanoseconds with the laser resonator;

generating a short pulse through a master oscillator;

boosting an energy of the short pulse through a power amplifier;

achieving a set of laser parameters through a master oscillator power amplifier (MOPA) system,
wherein the set of laser parameters is at least one of a requisite pulse width, a requisite beam quality and a requisite laser frequency;

customizing a controller using a specially-designed computer processing unit to increase an efficiency of the laser resonator during the laser marking process; and compensating for a fault tolerance of a minor with an adjustable mirror holder to allow an optimal placement of the minor depending on a set of specifications associated with the set of minors.

8. The method of claim 7 further comprising:

applying an electric current to a semiconductor plate of the thermo-electric air cooler to generate a cold surface and a hot surface on opposite ends;

affixing the cold surface against a side of the laser resonator that holds the set of heat generating components;

affixing at least one of a heat sink and a fan adjacent to the hot surface of the thermo-electric air cooler; and dissipating, through at least one of the heat sink and the fan, a heat generated from the hot surface of the thermo-electric air cooler.

9. The method of claim 8 further comprising:

monitoring a temperature of the thermo-electric air cooler through a set of temperature sensors connected to a data processing unit;

controlling the temperature through the controller in the data processing unit; and altering a flow of current to the thermo-electric air cooler based on an information gathered from the set of temperature sensors and the data processing unit to stabilize the temperature.

10. The method of claim 9 further comprising:

sealing the laser resonator to eliminate a set of disturbances associated with outside environmental conditions;

positioning a heat generating component in a special pocket of the laser resonator;

affixing the cold surface of the thermo-electric air cooler directly adjacent to the special pocket to counteract the heat generated from the heat generating component; and generating a laser beam through the laser resonator optimized for thermo air cooling.

11. The method of claim 10 wherein the heat generating component is at least one of an optic crystal and an acousto-optic Q-switch.

12. The method of claim 11 further comprising:

concentrating, through the acousto-optic Q-switch, a power generated in the laser resonator into a set of short pulse bursts.

13. The method of claim 12 further comprising:

focusing a laser beam to create a laser spot size having a diameter of less than 150 microns;

generating the laser beam having a beam quality of $M^2$ less than 1.3; and achieving the laser spot size and the beam quality through an optimized design of the laser resonator.

14. The method of claim 13 further comprising:

utilizing a mathematical model to achieve the optimized design of the laser resonator;

positioning a set of minors at optimized distances based on the mathematical model; and utilizing a precise curvature of the set of mirrors based on the mathematical model.

15. The method of claim 14 further comprising:

controlling the laser resonator with the custom designed controller; and optimizing a set of electronics in the custom designed controller to increase the efficiency associated with the laser resonator.

16. The method of claim 15 further comprising:

configuring, through an adjustable minor holder, a position of the set of minors based on a set of characteristics associated with the set of mirrors; and repositioning the adjustable mirror holder to compensate for a set of fault tolerances associated with the set of mirrors.

17. The method of claim 16 wherein the set of fault tolerances is at least one of a focal length, damage threshold, a reflection and a curvature.

18. The method of claim 17 further comprising;

optimizing a set of characteristics associated with the laser resonator depending on a material of the securing means of the substance container that is to be marked; and generating a matrix of different settings based on the type of the material of the securing means of the substance container to determine a group of optimum settings for the material.

19. The method of claim 18 wherein the set of characteristics associated with the laser resonator is at least one of a laser frequency and a power of the laser.

* * * * *